US010318807B2

(12) United States Patent
Onomura (10) Patent No.: US 10,318,807 B2
(45) Date of Patent: Jun. 11, 2019

(54) TARGET SEARCHING APPARATUS, TARGET SEARCHING METHOD, AND COMPUTER READABLE MEDIUM

(71) Applicant: SUBARU CORPORATION, Tokyo (JP)

(72) Inventor: Yoichi Onomura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/650,027

(22) Filed: Jul. 14, 2017

(65) Prior Publication Data

US 2018/0075286 A1    Mar. 15, 2018

(30) Foreign Application Priority Data

Sep. 15, 2016  (JP) ................. 2016-180120

(51) Int. Cl.
*G06K 9/00* (2006.01)
*G06K 9/32* (2006.01)
*G03B 15/00* (2006.01)

(52) U.S. Cl.
CPC ......... *G06K 9/0063* (2013.01); *G03B 15/006* (2013.01); *G06K 9/3241* (2013.01)

(58) Field of Classification Search
USPC ....................................................... 382/103
See application file for complete search history.

(56) References Cited

U.S. PATENT DOCUMENTS

2013/0057701 A1* 3/2013 Ushijima ............... G03B 13/36
348/169

2015/0002284 A1* 1/2015 Matsuno .................. B60Q 9/00
340/435

FOREIGN PATENT DOCUMENTS

| JP | H07-081695 A | 3/1995 |
|----|--------------|--------|
| JP | 4170488 B2   | 10/2008 |
| JP | 2011-188147 A | 9/2011 |
| JP | 2012-049628 A | 3/2012 |

OTHER PUBLICATIONS

Office Action issued in corresponding Japanese Patent Application No. 2016-180120, dated Jun. 26, 2018.

* cited by examiner

*Primary Examiner* — Justin P. Misleh
(74) *Attorney, Agent, or Firm* — McDermott Will & Emery LLP (57) ABSTRACT

A target searching apparatus includes a display, an object region extractor, a feature amount calculator, a second feature amount calculator, and an object present region extractor. The object region extractor extracts, from a display image, an object region including an identification object. The feature amount calculator calculates in-region and out-region representative values of the image feature amount that respectively are representative values inside and outside the object region in the display image. The second feature amount calculator calculates a representative value of the image feature amount in each of a plurality of small regions into which the object region is divided. The object present region extractor extracts, from the plurality of small regions, one or more small region having the representative value that is closer to the in-region representative value than the out-region representative value, as an object present region in which the identification object is present.

15 Claims, 4 Drawing Sheets

TARGET SEARCHING APPARATUS, TARGET SEARCHING METHOD, AND COMPUTER READABLE MEDIUM

CROSS-REFERENCE TO RELATED APPLICATIONS

The present application claims priority from Japanese Patent Application No. 2016-180120 filed on Sep. 15, 2016, the entire contents of which are hereby incorporated by reference.

BACKGROUND

The technology relates to a target searching apparatus, a target searching method, and a computer readable medium having a target searching program that each search a predetermined detection target on the basis of a picture obtained by a camera.

Searching of a predetermined detection target may be performed while an operator who uses an optical camera sees a picture or an image obtained from a height by the optical camera. The predetermined detection target may be on the ground or at the sea. The optical camera may be mounted on an aircraft, etc. For example, reference is made to Japanese Patent No. 4170488.

Upon a searching activity of a predetermined detection target, an operator performs searching over a wide range while seeing a camera-obtained picture based on a wide angle of view. When an object that is a possible detection target is found, the operator turns a visual axis of the camera in a direction in which the object is found, and switches the camera from the wide angle of view to a narrow angle of view, i.e., performs zooming in, to confirm whether the object that is the possible detection target is an actual detection target. The operator returns the camera to the wide angle of view to continue performing the searching when the object is not the detection target. When the object is the detection target, the operator performs an orientation of an actual position or actual coordinates of the detection target, on the basis of a position of the detection target in the image.

SUMMARY

It is desired to easily perform identification of a detection target upon searching of the detection target based on a picture.

It is desirable to provide a target searching apparatus, a target searching method, and a computer readable medium having a target searching program that each make it possible to easily perform identification of a detection target.

An aspect of the technology provides a target searching apparatus including: a display configured to display an image captured by a capturing unit; an object region extractor configured to extract, from a display image, an object region including an identification object that is a possible detection target and is to be identified, in which the display image is the image displayed on the display; a feature amount calculator configured to calculate an in-region representative value of an image feature amount and an out-region representative value of the image feature amount in the display image, in which the in-region representative value of the image feature amount is a representative value of the image feature amount inside the object region in the display image, and the out-region representative value of the image feature amount is a representative value of the image feature amount outside the object region in the display image; a second feature amount calculator configured to calculate a representative value of the image feature amount in each of a plurality of small regions into which the object region is divided; and an object present region extractor configured to extract, from the plurality of small regions, one or more small regions each having the representative value of the image feature amount that is closer to the in-region representative value of the image feature amount than the out-region representative value of the image feature amount, as an object present region in which the identification object is present.

The target searching apparatus may further include: a zoom-in region calculator configured to calculate a zoom-in region, in which the zoom-in region is located around centroid of the object present region and includes the object present region at a predetermined area rate; and an angle-of-view adjuster configured to adjust an angle of view of the capturing unit by setting the zoom-in region as a zoom-in range.

The image feature amount may be based on one or more of luminance of the display image, a contrast of the display image, and a color of the display image.

The capturing unit may be mounted on an aircraft.
The capturing unit may be mounted on an aircraft.
The display may be mounted on the aircraft.
The display may be provided separately from the aircraft.

An aspect of the technology provides a target searching method including: causing an image captured by a capturing unit to be displayed on a display; extracting, from a display image, an object region including an identification object that is a possible detection target and is to be identified, in which the display image is the image displayed on the display; calculating an in-region representative value of an image feature amount and an out-region representative value of the image feature amount in the display image, in which the in-region representative value of the image feature amount is a representative value of the image feature amount inside the object region in the display image, and the out-region representative value of the image feature amount is a representative value of the image feature amount outside the object region in the display image; calculating a representative value of the image feature amount in each of a plurality of small regions into which the object region is divided; and extracting, from the plurality of small regions, one or more small regions each having the representative value of the image feature amount that is closer to the in-region representative value of the image feature amount than the out-region representative value of the image feature amount, as an object present region in which the identification object is present. An aspect of the technology provides a non-transitory computer readable medium having a target searching program that causes, when executed by a computer, the computer to perform a method. The method includes: causing an image captured by a capturing unit to be displayed on a display; extracting, from a display image, an object region including an identification object that is a possible detection target and is to be identified, in which the display image is the image displayed on the display; calculating an in-region representative value of an image feature amount and an out-region representative value of the image feature amount in the display image, in which the in-region representative value of the image feature amount is a representative value of the image feature amount inside the object region in the display image, and the out-region representative value of the image feature amount is a representative value of the image feature amount outside the object region in the display image; calculating a representative value of the image feature amount in each of a plurality of small regions into which the object region is divided; and extracting, from the plurality of small regions, one or more small regions each having the representative value of the image feature amount that is closer to the in-region representative value of the image feature amount than the out-region representative value of the image feature amount, as an object present region in which the identification object is present.

An aspect of the technology provides a target searching apparatus including: a display configured to display an image captured by a capturing unit; and circuitry. The circuitry is configured to extract, from a display image, an object region including an identification object that is a possible detection target and is to be identified, in which the display image is the image displayed on the display; calculate an in-region representative value of an image feature amount and an out-region representative value of the image feature amount in the display image, in which the in-region representative value of the image feature amount is a representative value of the image feature amount inside the object region in the display image, and the out-region representative value of the image feature amount is a representative value of the image feature amount outside the object region in the display image; calculate a representative value of the image feature amount in each of a plurality of small regions into which the object region is divided; and extract, from the plurality of small regions, one or more small regions each having the representative value of the image feature amount that is closer to the in-region representative value of the image feature amount than the out-region representative value of the image feature amount, as an object present region in which the identification object is present.

DETAILED DESCRIPTION

In the following, a description is given of one implementation of the technology with reference to the accompanying drawings. The following non-limiting implementation is based on an example in which a target searching apparatus according to one implementation of the technology is applied to an aircraft 1.
[Configuration]
First, a description is given of a configuration of the aircraft 1 according to one implementation with reference to FIG. 1.

Figure 1:
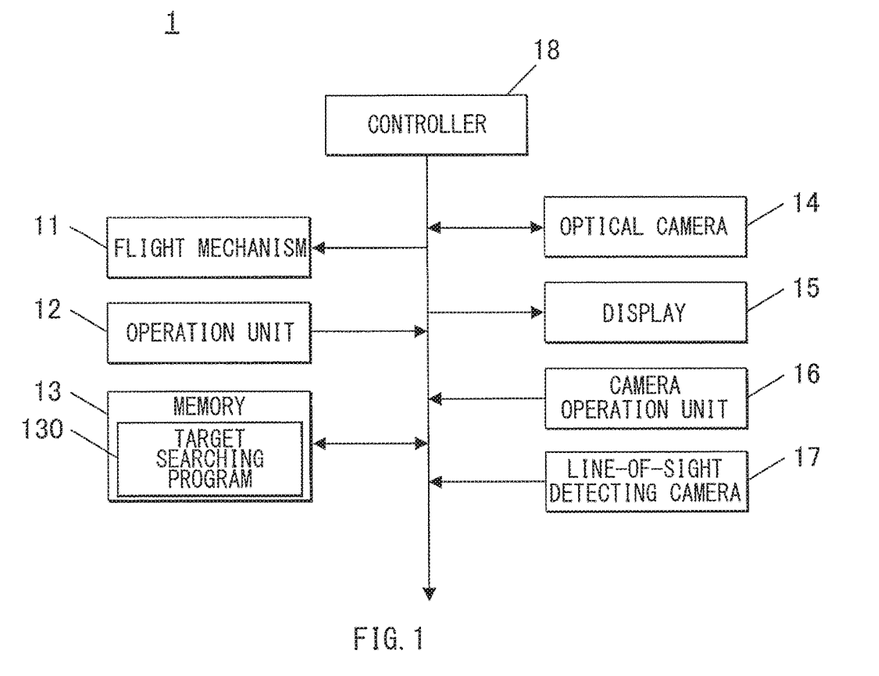
FIG. 1 is a block diagram illustrating an example of an outline configuration of an aircraft that includes a target searching apparatus according to one implementation of the technology.

FIG. 1 is a block diagram illustrating an outline configuration of the aircraft 1. The aircraft 1 may be directed to searching of a predetermined detection target. More specifically, the aircraft 1 is provided with the target searching apparatus according to one implementation of the technology, whereby the aircraft 1 is able to assist the searching of the detection target. The searching is performed by an operator (or a crew) in the aircraft 1 with use of an optical camera 14 mounted on the aircraft 1.

Referring to FIG. 1, the aircraft 1 may specifically include a flight mechanism 11, an operation unit 12, a memory 13, the optical camera 14, a display 15, a camera operation unit 16, a line-of-sight detecting camera 17, and a controller 18. In one implementation, the operation unit 12, the memory 13, the optical camera 14, the display 15, the camera operation unit 16, the line-of-sight detecting camera 17, and the controller 18 may serve as a "target searching apparatus".

The flight mechanism 11 may be a mechanism that causes the aircraft 1 to fly. The flight mechanism 11 may have members such as an internal-combustion mechanism that generates propulsion and a control surface actuator. For example, the internal-combustion mechanism may be a jet engine.

The operation unit 12 may include members such as a control stick operated by a pilot and various operation keys. The operation unit 12 may output, to the controller 18, a signal that corresponds to an operation state of the members including the control stick and the various operation keys.

The memory 13 may store programs and pieces of data directed to execution of various functions of the aircraft 1, and may also serve as a work area. In the present implementation, the memory 13 may store a target searching program 130.

The target searching program 130 may be a program that causes the controller 18 to execute later-described target searching processing.

The optical camera 14 may capture an image outside the aircraft 1. The optical camera 14 may be provided on a body of the aircraft 1. Specifically, the optical camera 14 may be placed on an unillustrated gimbal so that a facing direction of the optical camera 14 is varied. The optical camera 14 may capture a moving image and/or a still image below the body of the aircraft 1, and output image information that is information of on the thus-obtained image to the controller 18.

The display 15 may display the image captured by the optical camera 14, on the basis of a display signal received from the controller 18.

The camera operation unit 16 may be directed to operation of the optical camera 14. The camera operation unit 16 may allow for operations such as varying the facing direction of the optical camera 14, performing zooming in of the optical camera 14, and performing zooming out of the optical camera 14. In the present implementation, the camera operation unit 16 may be operated by a dedicated operator who is different from the pilot. In an alternative implementation, however, the pilot may operate the camera operation unit 16. The operator may operate the camera operation unit 16 while seeing, with the display 15, the image captured by the optical camera 14.

The line-of-sight detecting camera 17 may detect a line-of-sight (or an eye movement) of the operator who sees the display 15. The line-of-sight detecting camera 17 may be so provided as to face the face of the operator. The line-of-sight detecting camera 17 may capture the eye movement of the operator, and output image information on the captured eye movement to the controller 18.

In one implementation, the line-of-sight detecting camera 17 may be provided integrally with the display 15.

The controller 18 may centrally control each part of the aircraft 1. For example, the controller 18 may control driving of the flight mechanism 11 to control flight of the aircraft 1, and expand a program stored in the memory 13 to execute various processes in association with the expanded program.

Figure 2:
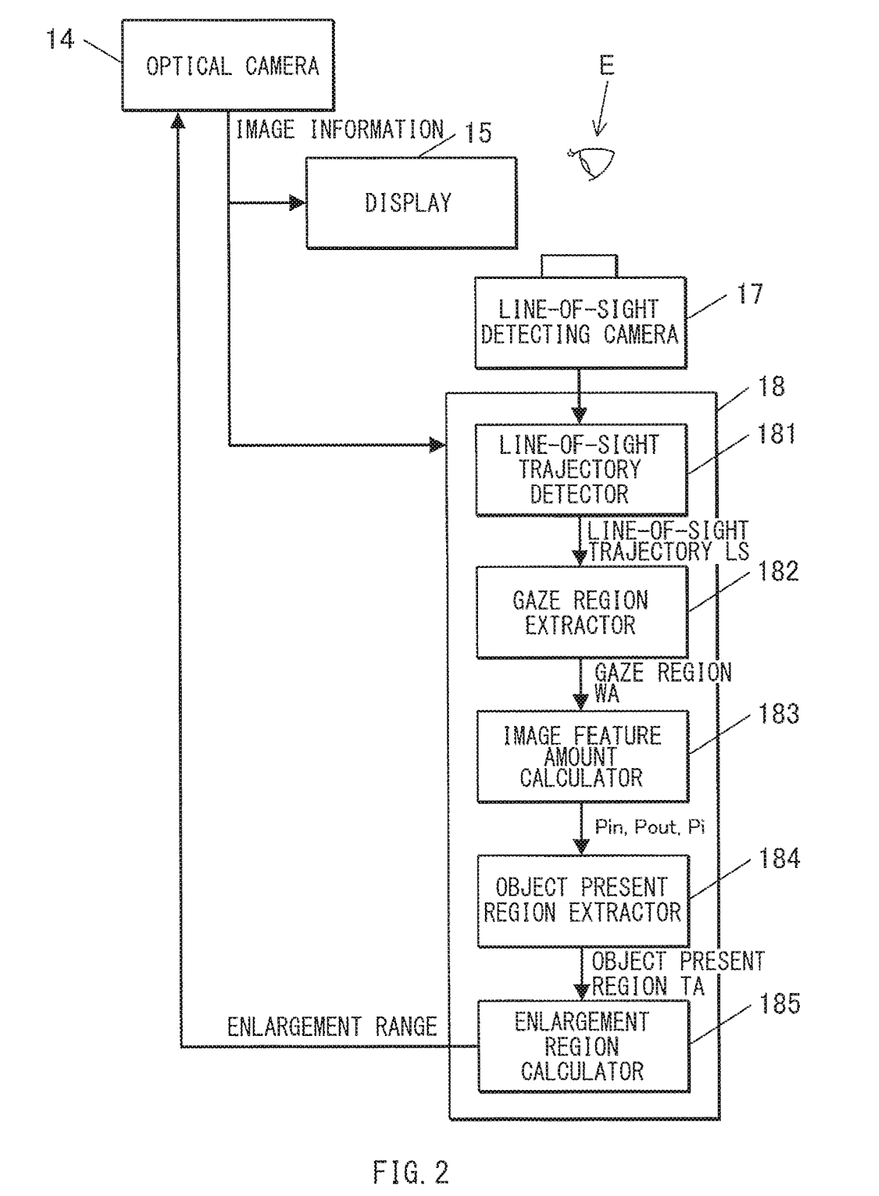
FIG. 2 is a data flowchart illustrating an example of a flow of data in target searching processing.

Further, as described later in greater detail, the controller 18 may include, as various functional units related to the target searching process, a line-of-sight trajectory detector 181, a gaze region extractor 182, an image feature amount calculator 183, an object present region extractor 184, and a zoom-in region calculator 185, as illustrated in FIG. 2. In one implementation, the line-of-sight trajectory detector 181 and the gaze region extractor 182 may serve as an "object region extractor", the image feature amount calculator 183 may serve as a "feature amount calculator" and a "second feature amount calculator", the object present region extractor 184 may serve as an "object present region extractor", and the zoom-in region calculator 185 may serve as a "zoom-in region calculator".

[Operation]

A description is given next of operations of the aircraft 1 upon executing the target searching processing.

FIG. 2 is a data flowchart illustrating an example of a flow of data in the target searching processing. FIGS. 3A to 4C each describe the target searching processing.

The target searching processing may search the detection target on the basis of the image captured by the optical camera 14. In the present implementation, the target searching processing may assist the searching of the detection target performed by the operator while the operator sees the image captured by the optical camera 14. For example, the target searching processing may be executed in response to an input of instructions directed to the execution of the target searching processing. The input of the instructions may be based on an operation performed by the operator. Upon receiving the input of the instructions, the controller 18 may read the target searching program 130 from the memory 13 and expand the target searching program 130 to execute the target searching processing.

Figure 3A:
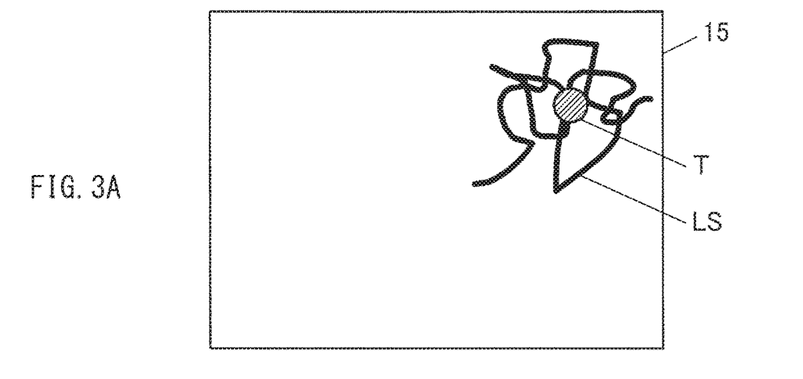
FIGS. 3A to 3C each describe an example of the target searching processing.

Note that, in the present implementation, an image of the ground, the sea, and/or the air below the body of the aircraft 1 is captured from the flying aircraft 1 by the optical camera 14, and the captured image is displayed on the display 15. In the illustrated example, an identification object T is included in the image displayed on the display 15 as a result of performing the capturing based on a wide angle of view by the optical camera 14 as illustrated in FIG. 3A. The identification object T is a possible detection target and is required to be subjected to identification as to whether the identification object T is the actual detection target.

Referring to FIG. 2, when the target searching processing is executed, the controller 18 may first capture, with the line-of-sight detecting camera 17, a movement of an eye E of the operator who sees the display 15, and detect, with the line-of-sight trajectory detector 181, a line-of-sight trajectory LS of the operator on the basis of the information on the captured image.

In one specific but non-limiting example, the line-of-sight trajectory detector 181 may detect a line-of-sight of the operator on the basis of a positional relationship between a reference point and a moving point. For example, the reference point and the moving point may respectively be a corneal reflex and a pupil. Alternatively, the reference point and the moving point may respectively be an eye corner and an iris. The line-of-sight trajectory detector 181 may store a movement over a predetermined time period of the line-of-sight, to thereby detect the line-of-sight trajectory LS of the operator on the image displayed on the display 15. For example, the predetermined time period may be seconds.

This obtains the line-of-sight trajectory LS of the line-of-sight of the operator that catches the identification object T and goes back and forth around the identification object T on the image displayed on the display 15 as illustrated in FIG. 3A.

Thereafter, the controller 18 may extract, with the gaze region extractor 182, a gaze region WA on the basis of the thus-detected line-of-sight trajectory LS. The gaze region WA may be a region at which the operator has gazed in the image displayed on the display 15.

Figure 3B:
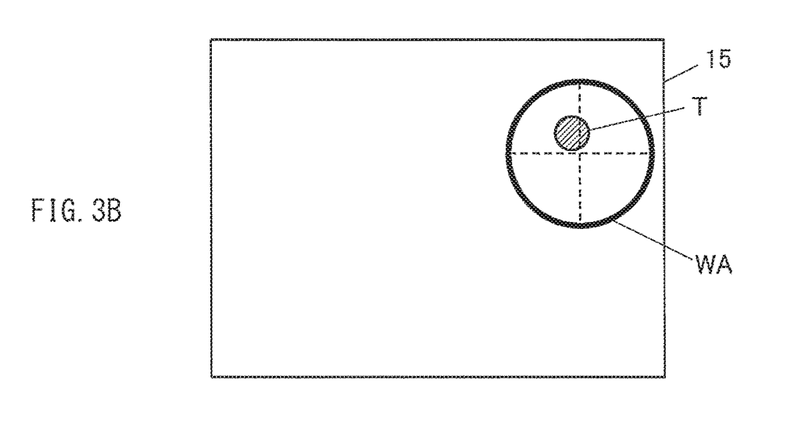

In one specific but non-limiting example, the gaze region extractor 182 may determine, as the gaze region WA, a circular region that is located around an average position of the line-of-sight trajectory LS and corresponds to a region in which probability of presence of the line-of-sight trajectory LS takes a predetermined value or higher, as illustrated in FIG. 3B. For example, when determining the circular region corresponding to a region in which the probability of presence of the line-of-sight trajectory LS is 50% or higher, the gaze region extractor 182 may determine, as the gaze region WA, a circular region in which a value of a radius corresponds to a value of a circular error probability (CEP).

This extracts, from the image displayed on the display 15, the gaze region WA at which the operator has gazed, as an object region including the identification object T.

Figure 3C:
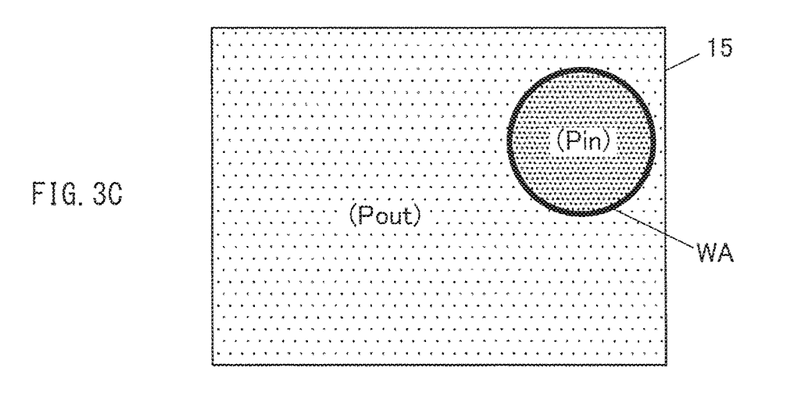

Thereafter, the controller 18 may calculate, with the image feature amount calculator 183, an image feature amount in the image displayed on the display 15, on the basis of the image information received from the optical camera 14.

In one specific but non-limiting example, as illustrated in FIG. 3C, the image feature amount calculator 183 may calculate a representative value Pin of the image feature amount in a region inside the gaze region WA in the image displayed on the display 15 and a representative value Pout of the image feature amount in a region outside the gaze region WA in the image displayed on the display 15. The image feature amount calculator 183 may calculate the representative value Pin of the image feature amount as an areal average value of the image feature amounts in the entire region inside the gaze region WA. The image feature amount calculator 183 may calculate the representative value Pout of the image feature amount as an areal average value of the image feature amounts in the entire region outside the gaze region WA.

In the present implementation, the image feature amount may be based on one or more of image parameters such as luminance, a contrast, and a color (a hue) of the image displayed on the display 15. In the present implementation, the foregoing image parameters may each be weighted. The image feature amount may be a value of the sum of the weighted image parameters. The image feature amount may be preferably calculated by weighting the color (the hue) more heavily than other image parameters such as the luminance and the contrast, in view of determining presence of the identification object T. One reason for this is that the color is less influenced by a factor such as weather than other image parameters such as the luminance and the contrast.

Figure 4A:
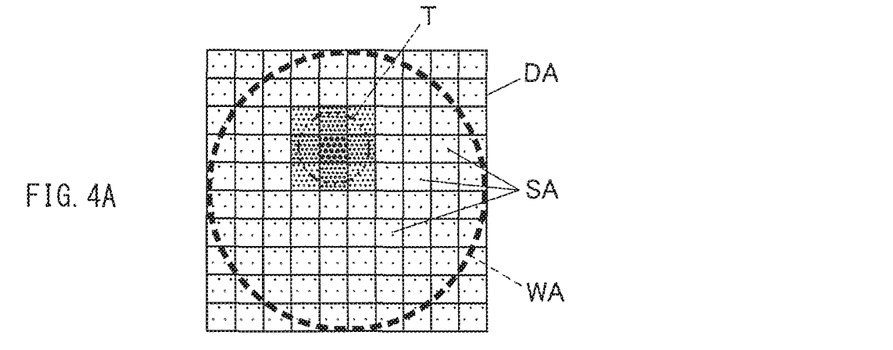
FIGS. 4A to 4C each describe an example of the target searching processing.
Figure 4B:
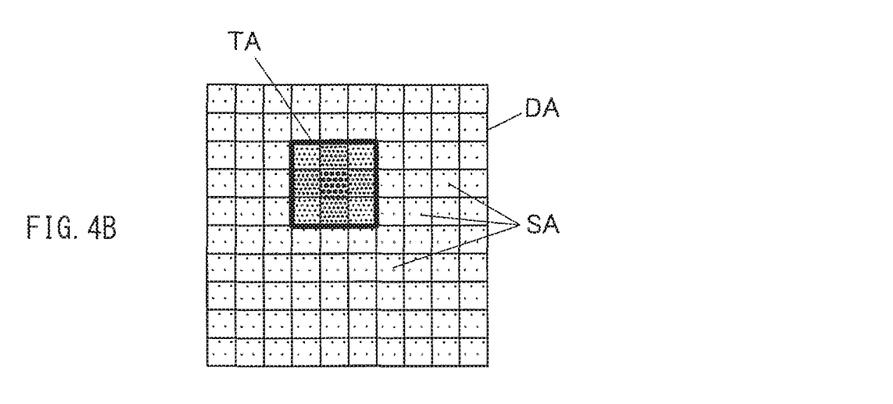

FIGS. 3C, 4A, and 4B each express the magnitude of the respective values of the image feature amount by density of dots. The image feature amount may be set to have a greater value for the identification object T, for example.

Further, the image feature amount calculator 183 may divide the gaze region WA into a plurality of small regions SA, and calculate a representative value Pi of the image feature amount in each of the small regions SA as illustrated in FIG. 4A.

In one specific but non-limiting example, the image feature amount calculator 183 may first set, as a to-be-divided region DA including the gaze region WA, a square region having sides that are substantially parallel to a vertical line or a horizontal line of the image displayed on the display 15 and having the gaze region as its inscribed circle. The image feature amount calculator 183 may thereafter divide the to-be-divided region DA in a grid pattern including a plurality of square small regions SA each having sides that are substantially parallel to the vertical line or the horizontal line of the image displayed on the display 15. Further, the image feature amount calculator 183 may calculate the representative value Pi of the image feature amount in each of the small regions SA as an areal average value of the corresponding small region SA.

The to-be-divided region DA is not particularly limited in its size, its shape, etc. as long as the to-be-divided region DA includes the gaze region WA.

Each of the small regions SA is not particularly limited in its size, its shape, etc. as long as the small regions SA are able to divide the gaze region WA into a plurality of regions. In a specific but non-limiting example, each of the small regions SA may correspond to one of the pixels in the image displayed on the display 15. It may be, however, preferable that each of the small regions SA be smaller in size than the identification object T in the image displayed on the display 15.

Thereafter, the controller 18 may extract, with the object present region extractor 184, the small region SA having the following condition from the small regions SA, as an object present region TA in which the identification object T is present, as illustrated in FIG. 4B. Specifically, the controller 18 may extract the small region SA having the representative value Pi of the image feature amount that is closer to the representative value Pin of the image feature amount inside the gaze region WA than the representative value Pout of the image feature amount outside the gaze region WA.

In one specific but non-limiting example, the object present region extractor 184 may extract the small region SA having the representative value Pi of the image feature amount that satisfies the following expression (1), from all of the small regions SA in the to-be-divided region DA.

$$|Pi-Pin| < |Pi-Pout| \quad (1)$$

Further, the object present region extractor 184 may set, as the object present region TA, a region formed by all of the extracted small regions SA.

For example, it may be estimated that a portion in which the identification object T is present has a greater image feature amount on the image displayed on the display 15. On the basis of this estimation, the representative value Pin inside the gaze region WA may be greater than the representative value Pout outside the gaze region WA, and the representative value Pi of each of the small regions SA in which the identification target T is present may be closer to the representative value Pin than the representative value Pout.

It is therefore possible to specify a region in which the identification object T is present by extracting the small region SA having the representative value Pi that satisfies the foregoing expression (1).

Figure 4C:
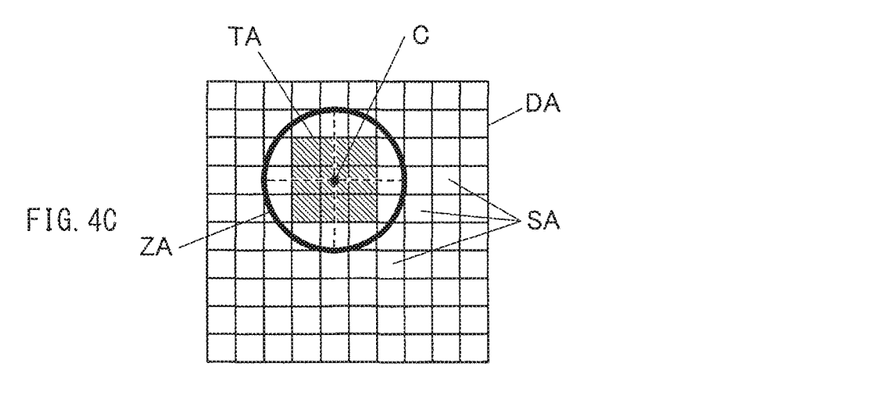

Thereafter, as illustrated in FIG. 4C, the controller 18 may calculate, with the zoom-in region calculator 185, centroid C of the object present region TA. Further, the controller 18 may calculate, with the zoom-in region calculator 185, a circular zoom-in region ZA that is located around the calculated centroid C and includes the entire object present region TA at a predetermined area rate.

Further, the controller 18 may control an operation of the optical camera 14. The controller 18 may thereby so adjust a visual axis and an angle of view of the optical camera 14 that the centroid C corresponds to the visual axis of the optical camera 14 and the zoom-in region ZA is set as a zoom-in range.

This may allow the zoom-in region ZA to be displayed in an enlarged manner on the entire screen of the display 15. In other words, the object present region TA having the high image feature amount, i.e., the identification object T may be automatically displayed on the display 15 in an enlarged manner, within the gaze region WA at which the operator has gazed.

Thereafter, the operator may see an image of the zoom-in region ZA displayed on the display 15, and perform identification as to whether the identification object T displayed in an enlarged manner is the predetermined detection target.

When the identification object T is the detection target, the controller 18 may perform an orientation of a position or coordinates of the identification object T on the basis of an operation performed by the operator, and end the target searching processing.

When the identification object T is not the detection target, the operator may operate the camera operation unit 16, and thereby returns the optical camera 14 to the wide angle of view. Thereafter, the controller 18 may repeatedly perform, in a continuous fashion, the processes of extracting the gaze region WA, calculating the representative values Pin, Pout, and Pi of the image feature amount, extracting the object present region TA, calculating the zoom-in region ZA, adjusting the angle of view of the optical camera 14, and the specification of the detection target, until the orientation of the position of the detection target T is successful.

[Effects]

According to the present implementation, the gaze region WA including the identification object T that is the possible detection target is extracted from the image captured by the optical camera 14 and displayed on the display 15. Further, calculations are performed to determine the representative value Pin of the image feature amount inside the gaze region WA in the image displayed on the display 15, the representative value Pout of the image feature amount outside the gaze region WA in the image displayed on the display 15, and the representative value Pi of the image feature amount in each of the small regions SA derived from the division of the gaze region WA. Further, the small region SA having the representative value Pi of the image feature amount that is closer to the representative value Pin of the feature amount inside the gaze region WA than the representative value Pout of the feature amount outside the gaze region WA may be extracted from the small regions SA as the object present region TA in which the identification object T is present.

This allows the object present region TA in which the identification object T is present to be favorably extracted from the gaze region WA, on the basis of the image feature amount. Hence, it is possible to easily perform the specification as to whether the identification object T is the detection target by confirming the extracted object present region TA.

Moreover, the zoom-in region ZA that is located around the centroid C of the object present region TA and includes the object present region TA at the predetermined area rate may be calculated. Further, the angle of view of the optical camera 14 may be so adjusted that the zoom-in region ZA thus calculated is set as the zoom-in range.

An enlarged image that allows for understanding of a specific shape of the identification object T while figuring out the whole of the identification object T is thereby automatically displayed on the display 15. Hence, it is possible to perform the identification as to whether the identification object T is the detection target further more easily.

Moreover, the gaze region WA at which the operator has gazed may be extracted from the display image displayed on the display 15 as the object region including the identification object T, on the basis of the line-of-sight trajectory LS of the operator on the display image displayed on the display 15.

The region including the identification object T is thereby automatically extracted by only the operator's action of seeing with his/her eyes the identification target T that is the possible detection target on the display image displayed on the display 15. Hence, it is possible to reduce an operation burden imposed on the operator.

Specifically, an operation burden imposed on an operator may be extremely heavy in an example case upon a searching activity where the operator repeatedly perform the following operation until the detection target is found. Specifically, the operator performs searching in a wide range while seeing a picture captured by a camera having a wide angle of view. When a possible detection target is found, the operator turns a visual axis of the camera in a direction in which the possible detection target is found, and switches the camera from the wide angle of view to a narrow angle of view, i.e., performs zooming in, to confirm whether the possible detection target is an actual detection target. In order to reduce the operation burden imposed on the operator in such a case, one measure is to automatically extract a region including the object from the image captured in the wide angle of view, for example, by detecting the line of sight of the operator, and to perform zooming in of the extracted region. The detection of the line of sight, however, lacks detection of the size of the object, therefore having difficulty in setting an appropriate angle of view, i.e., an appropriate zoom-in range, upon performing zooming in of the extracted region. This may lead to an excessively-low or excessively-high zoom ratio with respect to the object. In this case, it is not possible for the operator to obtain an enlarged image that allows for understanding of a specific shape of the object while figuring out the whole of the object. Hence, it may be difficult for the operator to perform the identification as to whether the object is the detection target.

In contrast, according to the target searching apparatus of the present implementation, the gaze region WA including the identification object T that is the possible detection target is first determined on the basis of the display image. Further, the object present region TA in which the identification object T is present is determined on the basis of the representative value Pi of the image feature amount in each of the small regions SA derived from the division of the gaze region WA. Further, the zoom-in region ZA is determined on the basis of the thus-determined object present region TA, and the angle of view of the optical camera 14 is adjusted on the basis of the determined zoom-in region ZA. The enlarged image that allows for understanding of the specific shape of the identification object T while figuring out the whole of the identification object T is thereby displayed automatically on the display 15 in the target searching apparatus of the present implementation. Hence, it is possible for the operator to easily perform the identification as to whether the identification object T is the detection target.

[Modification Examples]

Although some implementations of the technology have been described in the foregoing, the technology is not limited to those implementations, and may be modified in a wide variety of ways as needed without departing from the scope as defined by the appended claims.

For example, in the foregoing implementation, the zoom-in region ZA is the circular region that includes the object present region TA at the predetermined area rate. The shape of the zoom-in region ZA, however, is not limited to a circular shape. In an alternative implementation, the zoom-in region ZA may have a shape that corresponds to the shape of the object present region TA or any other shape, for example. In this implementation, the zoom-in region ZA may include the object present region TA at an area rate that corresponds to the shape of the object present region TA or any other shape, for example.

Further, in the foregoing implementation, the gaze region WA at which the operator has gazed is extracted as the object region including the identification object T. The object region including the identification object T to be extracted is, however, not limited to a region based on an action of the operator. In an alternative implementation, the object region including the identification object T may be extracted on the basis of image processing or any other processing, for example.

Further, the way of performing the identification as to whether the identification object T is the detection target is not limited to visual identification performed by the operator. In an alternative implementation, the identification as to whether the identification object T is the detection target may be made by image processing or any other processing. In another alternative implementation, the identification may be made on the basis of a distance from the optical camera 14 or the aircraft 1 that is obtained with a ranging device such as an optical sensor and radar. In still another alternative implementation, the identification may be made on the basis of an altitude that is determined on the basis of the thus-obtained distance from the optical camera 14 or the aircraft 1.

Further, in the foregoing implementation, the operator on the aircraft 1 performs the searching of the detection target. In an alternative implementation, however, the operator may be at any location other than the aircraft 1 as long as the optical camera 14 is mounted on the aircraft 1 to be able to capture the image from a height. In such an alternative implementation, devices other than the optical camera 14, namely, such as the display 15, the camera operation unit 16, and the line-of-sight detecting camera 17, may be located, together with the operator, at any location other than the aircraft 1. Non-limiting examples of the location other than the aircraft 1 may include a facility on the ground. In other words, the operator at the ground facility or any other location may perform the searching on the basis of the image information transmitted from the optical camera 14 mounted on the aircraft 1. In one implementation, the optical camera 14 may serve as a "capturing unit".

Further, in the foregoing implementation, the optical camera 14 is mounted on the aircraft 1. However, it is not necessary for the optical camera 14 to be mounted on the aircraft 1 as long as the optical camera 14 is located at a high place and thus able to capture an image of the ground, the sea, and/or the air. In an alternative implementation, the optical camera 14 may be located on an upper part of a high building, or may be mounted on an unmanned aerial vehicle (UAV). As used herein, the term "aircraft" may encompass the UAV.

The controller 18 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the controller 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIGS. 1 and 2.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A target searching apparatus comprising:
a controller; and
a memory storing instructions that, when executed by the controller, cause the controller to:
provide for display, on a display, a first image captured by a camera;
extract, from the first image displayed on the display, an object region including an identification object that is a possible detection target and is to be identified;
calculate an in-region representative value of an image feature amount and an out-region representative value of the image feature amount in the displayed first image, the in-region representative value of the image feature amount being a representative value of the image feature amount inside the object region in the displayed first image, the out-region representative value of the image feature amount being a representative value of the image feature amount outside the object region in the displayed first image;
divide the object region into a plurality of small regions;
calculate a representative value of the image feature amount in each of the plurality of small regions;
extract, from the plurality of small regions, one or more small regions as an object present region in which the identification object is present, wherein a difference between the representative value of the image feature amount for each of the extracted one or more small regions and the in-region representative value of the image feature amount is smaller than a difference between the representative value of the image feature amount for each of the extract one or more small regions and the out-region representative value of the image feature amount;
adjust an angle of view of the camera to capture an enlarged view of the identification object present in the extracted object present region; and
provide for display, on the display, a second image captured by the camera using the adjusted angle of view, the second image comprising the enlarged view of the identification object.

2. The target searching apparatus according to claim 1, wherein the controller is further configured to:
calculate a zoom-in region, the zoom-in region being located around a centroid of the object present region and including the object present region at a predetermined area rate; and
adjust the angle of view of the camera by setting the zoom-in region as a zoom-in range.

3. The target searching apparatus according to claim 2, wherein the image feature amount is based on one or more of luminance of the first image, a contrast of the first image, and a color of the first image.

4. The target searching apparatus according to claim 2, wherein the controller detects a line-of-sight trajectory of an operator of the target searching apparatus on the first image displayed on the display, and extracts the object region from the first image on a basis of the detected line-of-sight trajectory.

5. The target searching apparatus according to claim 2, wherein the camera is mounted on an aircraft.

6. The target searching apparatus according to claim 5, wherein the display is mounted on the aircraft.

7. The target searching apparatus according to claim 5, wherein the display is provided separately from the aircraft.

8. The target searching apparatus according to claim 1, wherein the image feature amount is based on one or more of luminance of the first image, a contrast of the first image, and a color of the first image.

9. The target searching apparatus according to claim 1, wherein the controller detects a line-of-sight trajectory of an operator of the target searching apparatus on the first image displayed on the display, and extracts the object region from the first image on a basis of the detected line-of-sight trajectory.

10. The target searching apparatus according to claim 1, wherein the camera is mounted on an aircraft.

11. The target searching apparatus according to claim 10, wherein the display is mounted on the aircraft.

12. The target searching apparatus according to claim 10, wherein the display is provided separately from the aircraft.

13. A target searching method comprising:
providing for display, on a display, a first image captured by a camera;
extracting, from the displayed first image, an object region including an identification object that is a possible detection target and is to be identified;
calculating an in-region representative value of an image feature amount and an out-region representative value of the image feature amount in the displayed first image, the in-region representative value of the image feature amount being a representative value of the image feature amount inside the object region in the displayed first image, the out-region representative value of the image feature amount being a representative value of the image feature amount outside the object region in the displayed first image;
dividing the object region into a plurality of small regions;
calculating a representative value of the image feature amount in each of the plurality of small regions;

extracting, from the plurality of small regions, one or more small regions as an object present region in which the identification object is present, wherein a difference between the representative value of the image feature amount for each of the extracted one or more small regions and the in-region representative value of the image feature amount is smaller than a difference between the representative value of the image feature amount for each of the extract one or more small regions and the out-region representative value of the image feature amount;

adjusting an angle of view of the camera to capture an enlarged view of the identification object present in the extracted object present region; and providing for display, on the display, a second image captured by the camera using the adjusted angle of view, the second image comprising the enlarged view of the identification object.

14. A non-transitory computer readable medium having a target searching program that causes, when executed by a computer, the computer to perform a method, the method comprising:

providing for display, on a display, a first image captured by a camera;

extracting, from the displayed first image, an object region including an identification object that is a possible detection target and is to be identified;

calculating an in-region representative value of an image feature amount and an out-region representative value of the image feature amount in the displayed first image, the in-region representative value of the image feature amount being a representative value of the image feature amount inside the object region in the displayed first image, the out-region representative value of the image feature amount being a representative value of the image feature amount outside the object region in the displayed first image;

dividing the object region into a plurality of small regions;

calculating a representative value of the image feature amount in each of plurality of small regions;

extracting, from the plurality of small regions, one or more small regions as an object present region in which the identification object is present, wherein a difference between the representative value of the image feature amount for each of the extracted one or more small regions and the in-region representative value of the image feature amount is smaller than a difference between the representative value of the image feature amount for each of the extract one or more small regions and the out-region representative value of the image feature amount;

adjusting an angle of view of the camera to capture an enlarged view of the identification object present in the extracted object present region; and providing for display, on the display, a second image captured by the camera using the adjusted angle of view, the second image comprising the enlarged view of the identification object.

15. A target searching apparatus comprising:

a display configured to display an image captured by a camera; and circuitry configured to extract, from a first image displayed on the display, an object region including an identification object that is a possible detection target and is to be identified;

calculate an in-region representative value of an image feature amount and an out-region representative value of the image feature amount in the displayed first image, the in-region representative value of the image feature amount being a representative value of the image feature amount inside the object region in the displayed first image, the out-region representative value of the image feature amount being a representative value of the image feature amount outside the object region in the displayed first image;

divide the object region into a plurality of small regions;

calculate a representative value of the image feature amount in each of plurality of small regions into which the object region is divided;

extract, from the plurality of small regions, one or more small regions as an object present region in which the identification object is present, wherein a difference between the representative value of the image feature amount for each of the extracted one or more small regions and the in-region representative value of the image feature amount is smaller than a difference between the representative value of the image feature amount for each of the extract one or more small regions and the out-region representative value of the image feature amount;

adjust an angle of view of the camera to capture an enlarged view of the identification object present in the extracted object present region; and provide for display, on the display, a second image captured by the camera using the adjusted angle of view, the second image comprising the enlarged view of the identification object.

* * * * *